United States Patent
Healey et al.

(10) Patent No.: US 8,599,542 B1
(45) Date of Patent: Dec. 3, 2013

(54) COMBINED COVER, KEYBOARD AND STAND FOR TABLET COMPUTER WITH REVERSABLE CONNECTION FOR KEYBOARD AND READING CONFIGURATION

(71) Applicant: ZAGG Intellectual Property Holding Co., Salt Lake City, UT (US)

(72) Inventors: Arthur Healey, Centerville, UT (US); Jim Colby, Highland, UT (US); David Gengler, Draper, UT (US); Daniel Pryor Oakeson, West Jordan, UT (US); Jeffrey King, Kaysville, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 0 days.

(21) Appl. No.: 13/896,900

(22) Filed: May 17, 2013

(51) Int. Cl.
*H05K 7/00* (2006.01)

(52) U.S. Cl.
USPC ............ 361/679.17; 361/679.08; 361/679.09; 361/679.29; 361/679.3; 361/679.41; 345/168; 345/169; 455/575.3; 455/575.8

(58) Field of Classification Search
USPC ............. 361/679.01, 679.08, 679.09, 679.17, 361/679.41, 679.29, 679.3; 345/168, 169; 455/575.3, 575.8
See application file for complete search history.

(56) References Cited

U.S. PATENT DOCUMENTS

| | | | |
|---|---|---|---|
| 6,937,468 B2 * | 8/2005 | Lin et al. | 361/679.41 |
| 7,583,500 B2 * | 9/2009 | Ligtenberg et al. | 361/679.27 |
| 7,672,699 B2 * | 3/2010 | Kim et al. | 455/575.4 |
| 7,966,040 B2 * | 6/2011 | Kim et al. | 455/557 |
| 8,143,983 B1 * | 3/2012 | Lauder et al. | 335/219 |
| D659,139 S | 5/2012 | Gengler | |
| D671,541 S | 11/2012 | Gengler | |
| D672,352 S | 12/2012 | Gengler | |
| D673,574 S | 1/2013 | Gengler | |
| D676,031 S | 2/2013 | Melville et al. | |
| D676,853 S | 2/2013 | Gengler | |
| D678,885 S | 3/2013 | Gengler | |
| 8,390,412 B2 * | 3/2013 | Lauder et al. | 335/219 |
| D682,274 S | 5/2013 | Gengler | |
| 2004/0209489 A1 * | 10/2004 | Clapper | 439/39 |

(Continued)

OTHER PUBLICATIONS

Eee Pad Transformer TF101; http://www.asus.com/Tablets_Mobile/Eee_Pad_Transformer_TF101 accessed Apr. 12, 2013.

(Continued)

*Primary Examiner* — Hung S Bui
*Assistant Examiner* — James Wu
(74) *Attorney, Agent, or Firm* — Thorpe North & Western LLP

(57) ABSTRACT

A reversible connection device to attach a cover to a tablet computer in two opposite configurations has a channel pivotally coupled to the cover to receive an edge of the tablet computer. The channel has a first magnet array to magnetically attach to a magnet array of the edge of the tablet computer in a first orientation of the tablet computer with respect to the cover and the channel. A tab is movably coupled in and carried by the channel and movable into the channel. The tab has a second reversed magnet array to magnetically attach to the magnet array of the edge of the tablet computer in a second reversed orientation of the tablet computer with respect to the cover and the channel. The second reversed magnet array has a reversed orientation with respect to the first magnet array of the channel.

18 Claims, 11 Drawing Sheets

(56) References Cited

U.S. PATENT DOCUMENTS

| | | | |
|---|---|---|---|
| 2006/0152897 A1* | 7/2006 | Hirayama | 361/683 |
| 2008/0119250 A1* | 5/2008 | Cho et al. | 455/575.4 |
| 2008/0125200 A1* | 5/2008 | Park et al. | 455/575.4 |
| 2008/0139261 A1* | 6/2008 | Cho et al. | 455/575.4 |
| 2008/0176610 A1* | 7/2008 | Pan et al. | 455/575.3 |
| 2012/0008269 A1 | 1/2012 | Gengler | |
| 2012/0008299 A1 | 1/2012 | Gengler | |
| 2012/0114198 A1 | 5/2012 | Yang et al. | |
| 2012/0188697 A1* | 7/2012 | Chen et al. | 361/679.09 |
| 2012/0243149 A1* | 9/2012 | Gartrell et al. | 361/679.01 |
| 2012/0327580 A1 | 12/2012 | Gengler | |
| 2012/0327594 A1 | 12/2012 | Gengler | |
| 2013/0170126 A1* | 7/2013 | Lee | 361/679.17 |

OTHER PUBLICATIONS

Brydge; http://thebrydge.com/ accessed Apr. 12, 2013.

Lenovo Ideapad U1 Hybrid Notebook; http://uncrate.com/stuff/lenovo-ideapad-u1-hybrid-notebook/ accessed Apr. 12, 2013.

ClamCase® iPad Keyboard Cases & Stands; http://clamcase.com/ accessed Apr. 12, 2013.

iPad Keyboards, Cases, & Stands; ZAGGkeys PROplus iPad Keyboard; http://www.zagg.com/keyboard-cases/index.php accessed Apr. 12, 2013.

iPad Keyboards, Cases, & Stands; ZAGGkeys PROfolio; ZAGG Keyboards & Cases; http://www.zagg.com/keyboard-cases/index.php accessed Apr. 12, 2013.

iPad Keyboards, Cases, & Stands; ZAGGkeys PROfolio +; ZAGG Keyboards & Cases; http://www.zagg.com/keyboard-cases/index.php accessed Apr. 12, 2013.

iPad Keyboards, Cases, & Stands; ZAGGkeys PRO; ZAGG Keyboards http://www.zagg.com/keyboard-cases/index.php accessed Apr. 12, 2013.

iPad Keyboards, Cases, & Stands; Logitech Keyboard Case for iPad 3 & 4; ZAGG Keyboards & Cases; http://www.zagg.com/keyboard-cases/index.php accessed Apr. 12, 2013.

iPad Keyboards, Cases, & Stands; ZAGGkeys FLEX; ZAGG Keyboards & Cases; http://www.zagg.com/keyboard-cases/index.php accessed Apr. 12, 2013.

Ultrathin Keyboard Cover for iPad—Logitech; Ultrathin Keyboard Cover; http://www.logitech.com/en-us/product/ultrathin-keyboard-cover accessed Apr. 12, 2013.

CruxSKUNK—CruxCase; http://www.cruxcase.com/products/cruxskunk/ accessed Apr. 12, 2013.

CruxFLIP—CruxCase; http://www.cruxcase.com/products/cruxflip-3/ accessed Apr. 12, 2013.

Crux360—CruxCase; http://www.cruxcase.com/products/crux360-for-ipad-3 accessed Apr. 12, 2013.

Kickstarter; Brydge + iPad: Do more. By Brad Leong; http://www.kickstarter.com/projects/552506690/brydge-ipad-do-more?play=1&ref=search accessed Apr. 15, 2013.

* cited by examiner

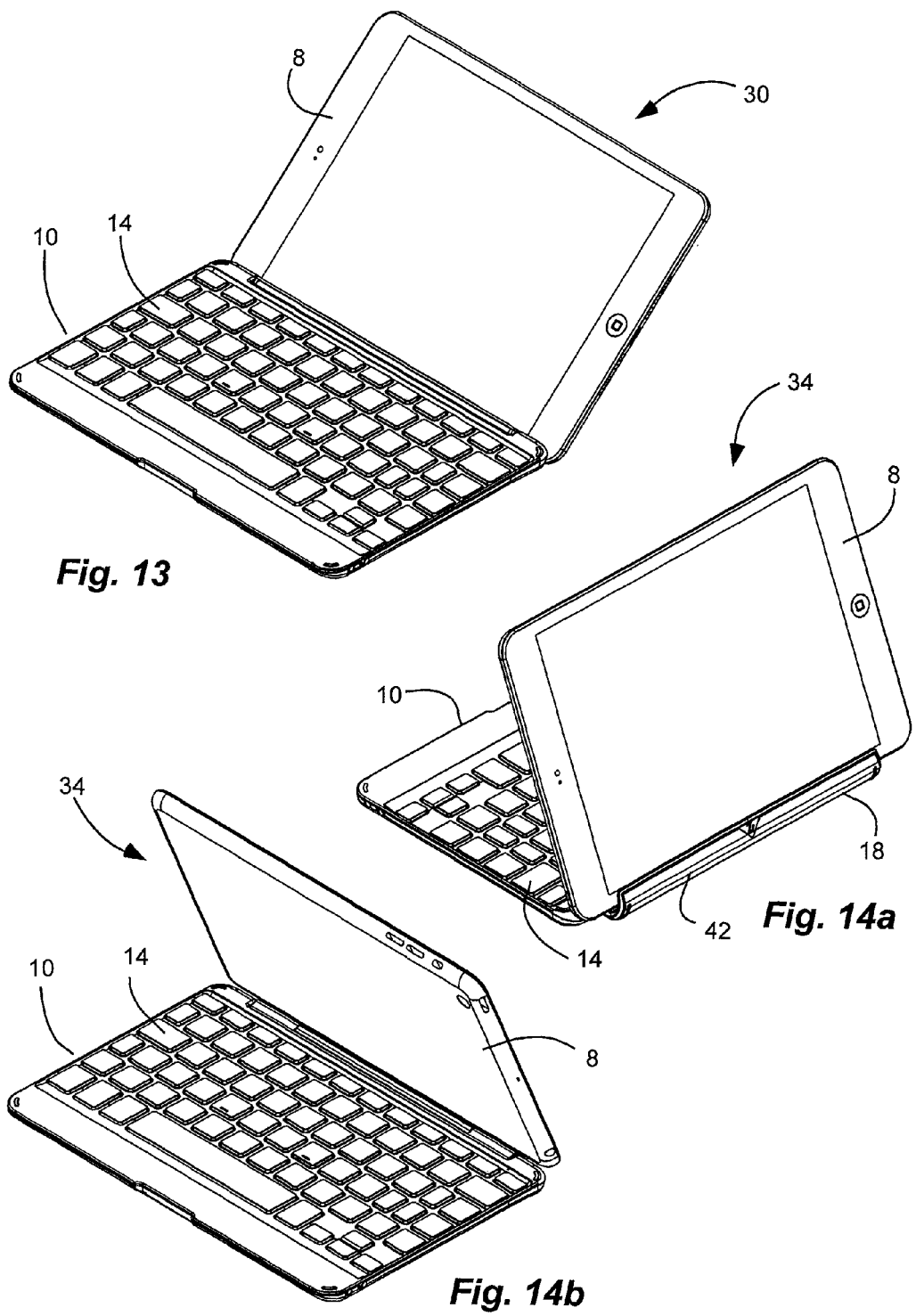

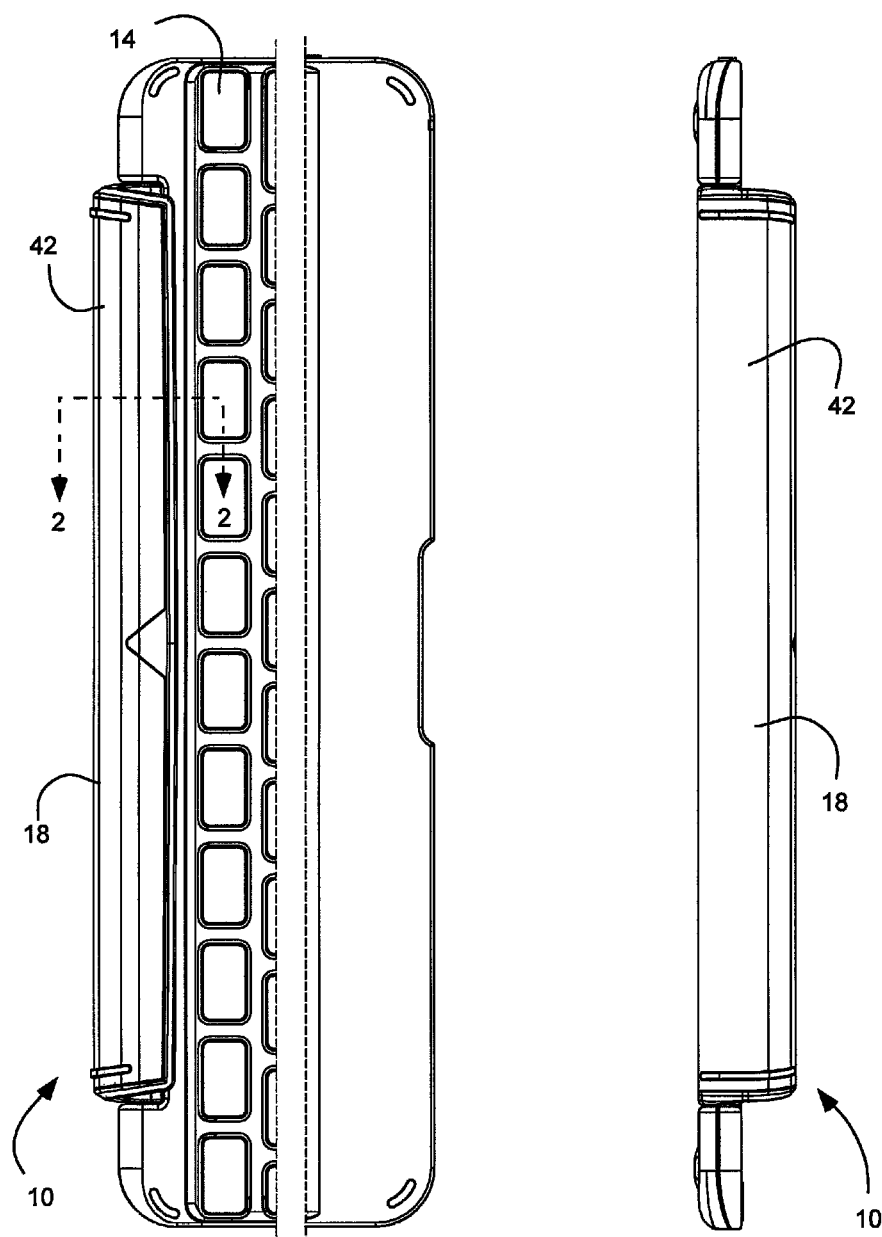
*Fig. 21*  *Fig. 22*

COMBINED COVER, KEYBOARD AND STAND FOR TABLET COMPUTER WITH REVERSABLE CONNECTION FOR KEYBOARD AND READING CONFIGURATION

BACKGROUND

1. Field of the Invention

The present invention relates generally to removable keyboards for tablet computers.

2. Related Art

Tablet computers or tablets, such as the Apple® iPad® tablet computer, have grown in popularity. Such tablet computers are often thin, rectilinear computers with a broad touch screen that can offer media viewing and user input through a graphical keyboard. Such tablet computers can also have a patterned magnet array to magnetically attach to a cover.

Tablet computers risk damage from dropping because their small size and light weight promote mobility and holding. Often, the tablet computer has a slim, streamline case that is aesthetically pleasing but difficult to grasp and hold. User's often supplement the tablet computer with a case or folio to protect the screen and the tablet computer. Such cases or folios can often enclose or envelope the back, edges, and front perimeter of the tablet computer. Other cases can grip or pinch the tablet computer.

Typing or keyed entry on the tablet computers can be difficult due to the lack of haptic or tactile response of the graphical keyboard, and the large amount of space required by the graphical keyboard leaves a small viewing area. User's often supplement the tablet computer with a wireless keyboard to facilitate typing or keyed entry. Such wireless keyboards can also be incorporated into the case or folio. Again, such cases or folios can often enclose or envelope the back, edges, and front perimeter of the tablet computer. Alternatively, such keyboards can have a tray to receive the tablet computer thereon Such tablet computers are often used in a landscape orientation (i.e. with the length or longer dimension horizontally oriented) for viewing media. In addition, such tablet computers can be used in a portrait orientation (i.e. with the width or narrower dimension horizontally oriented) for reading text or electronic books. The above described cases and/or keyboards often do not readily lend themselves to prolonged holding or reading, and are often removed by the user for such activity.

SUMMARY OF THE INVENTION

It has been recognized that it would be advantageous to develop a cover, keyboard, stand and/or grip or combination thereof that is capable of providing various different configurations including: a cover configuration to cover the screen, a keyboard configuration to carry the tablet while receiving keystrokes, a stand configuration to hold the screen for viewing, a reading configuration to facilitate grasping and holding the tablet, and/or combinations thereof. In addition, it has been recognized that it would be advantageous to provide a cover, keyboard, stand or grip or combination thereof that is reversibly attachable to the tablet, while accounting for a non-symmetrical profile and/or patterned magnetic array of the tablet computer.

The invention provides a reversible connection device configured to attach a cover to a tablet computer in two opposite configurations. The device comprises a channel pivotally coupled to the cover and configured to receive an edge of the tablet computer therein. The channel has a first magnet array configured to magnetically attach to a magnet array of the edge of the tablet computer in a first orientation of the tablet computer with respect to the cover and the channel. A tab is movably coupled in and carried by the channel and movable into the channel. The tab has a second reversed magnet array configured to magnetically attach to the magnet array of the edge of the tablet computer in a second reversed orientation of the tablet computer with respect to the cover and the channel. The second reversed magnet array has a reversed orientation with respect to the first magnet array of the channel.

In accordance with a more detailed aspect of the invention, the cover can further comprise a keyboard. The cover can have at least three different configurations with respect to the tablet computer, including: a cover configuration, a keyboard configuration and a reading configuration. In the cover configuration, a keyboard side of the cover is closed opposing a screen side of the tablet computer, and the tablet computer is magnetically attached to the first magnet array of the channel. In the keyboard configuration, the keyboard side of the cover and the screen side of the tablet computer are pivoted away from one another and exposed for use, and the tablet computer is magnetically attached to the first magnet array of the channel. In the reading configuration, the keyboard side of the cover is closed opposing the back side of the tablet computer so that the screen side of the tablet computer and the back side of the cover are exposed, and the tablet computer is magnetically attached to the second reversed magnet array of the tab in the channel. In a fourth or stand configuration, the cover and the tablet computer are pivoted away from one another with a bottom of the cover disposed on a support surface and the screen side of the tablet computer oriented at an obtuse angle with respect to the support surface, and the tablet computer is magnetically attached to the second reversed magnet array of the tab in the channel.

In accordance with a more detailed aspect of the invention, an interior of the channel can have an interior profile configured to substantially match a profile of an edge of the tablet computer. The tab can have a profile matching at least a portion of the profile of the edge of the tablet computer. The tablet computer can extend into the channel a first distance in the first orientation, and into the channel a second distance shorter than the first distance in the second reversed orientation. The tab with the second reversed magnet array can move into an interior of the channel, and between the magnet array of the tablet computer and the first magnet array of the channel, in the second reversed orientation of the tablet computer with respect to the cover and the channel. The magnetic array of the tablet computer can be spaced-apart from the first magnet array of the channel in the second reversed orientation of the tablet computer with respect to the cover and the channel by a gap into which the tab with the second reversed magnet array moves in the second reversed orientation.

In addition, the invention provides a combined cover and keyboard device configured for a tablet computer having an edge with a non-symmetrical profile and a patterned magnet array. The device comprises a keyboard. A channel is pivotally coupled to an edge of the keyboard and configured to removably receive the edge of the tablet computer. The channel has an interior with a profile substantially matching the profile of the edge of the tablet computer in a first orientation of the tablet computer with respect to the keyboard. A first patterned magnet array is disposed in and carried by the channel, and configured to magnetically couple to the patterned magnet array of the tablet computer in the first orientation. A strip is pivotally coupled in and carried by the channel. The strip has a profile matching at least a portion of the profile of the edge of the tablet computer in a second reversed orientation of the tablet computer with respect to the keyboard. A second patterned magnet array is carried by the strip, and configured to magnetically attach to the magnet array of the edge of the tablet computer in the second reversed orientation of the tablet computer with respect to the keyboard. The second patterned magnet array of the strip is reversed with respect to the first patterned magnet array of the channel. The keyboard and the tablet computer are reversible with respect to one another, and have at least three different configurations with respect to one another, including: a cover configuration, a keyboard configuration and a reading configuration. In the cover configuration, a keyboard side of the keyboard is closed opposing a screen side of the tablet computer, and the tablet computer is magnetically attached to the first magnet array of the channel. In the keyboard configuration, the keyboard side of the keyboard and the screen side of the tablet computer are pivoted away from one another and exposed for use, and the tablet computer is magnetically attached to the first magnet array of the channel. In the reading configuration, the keyboard side of the keyboard is closed opposing the back side of the tablet computer so that the screen side of the tablet computer and the back side of the keyboard are exposed, and the tablet computer is magnetically attached to the second reversed magnet array of the tab in the channel.

In accordance with a more detailed aspect of the invention, the device can comprise cavity in a channel wall to receive the strip therein. The strip with the second reversed magnet array can move into an interior of the channel, and between the magnet array of the tablet computer and the first magnet array of the channel, in the second reversed orientation of the tablet computer with respect to the cover and the channel. The magnetic array of the tablet computer can be spaced-apart from the first magnet array of the channel in the second reversed orientation of the tablet computer with respect to the cover and the channel by a gap into which the strip with the second reversed magnet array moves in the second reversed orientation. The tablet computer can extend into the channel a first distance in the first orientation, and into the channel a second distance shorter than the first distance in the second reversed orientation.

In addition, the invention provides a reversible connection device configured to reversibly connect a panel to a tablet computer in two opposite configurations. The device comprises a first magnet array carried by the connection device, and configured to magnetically attach to a magnet array of the edge of the tablet computer in a first orientation of the tablet computer with respect to the panel. A second reverse magnet array is carried by the connection device, and is separate and discrete from the first magnet array. The second reverse magnet array is configured to magnetically attach to the magnet array of the edge of the tablet computer in a second reverse orientation of the tablet computer with respect to the panel. The second reverse magnet array has a reversed orientation with respect to the first magnet array.

In accordance with a more detailed aspect of the invention, the second reverse magnet array can be movable with respect to the first magnet array.

Furthermore, the invention provides a reversible connection device configured to reversibly connect a keyboard to a tablet computer in two opposite configurations. The device comprises a channel pivotally coupled to the keyboard and configured to removably receive an edge of the tablet computer therein. The keyboard has at least two different configurations with respect to the tablet computer, including: a keyboard configuration and a reading configuration. In the keyboard configuration, the keyboard and a screen side of the tablet computer are exposed for use defining a first orientation of the tablet computer with respect to the keyboard. In the readying configuration, the keyboard is closed opposing a back side of the tablet computer so that the screen side of the tablet computer and a back side of the keyboard are exposed defining a second reversed orientation of the tablet computer with respect to the keyboard.

In accordance with a more detailed aspect of the invention, the keyboard can have at least three different configurations with respect to the tablet computer, further including a cover configuration in which the keyboard is closed opposing the screen side of the tablet computer with the first orientation of the tablet computer with respect to the keyboard.

The invention also provides a reversible connection device configured to attach an asymmetrical edge of a tablet computer to a keyboard in two opposite configurations. The device comprises a channel pivotally coupled to an edge of the keyboard, and having an interior with a profile configured to substantially match a profile of the edge of the tablet computer. The channel also has a magnet array configured to magnetically attach to a magnet array of the edge of the tablet computer. A strip is carried by the channel, and movable between a retracted position out of the interior of the channel and an extended position in the interior of the channel. The channel has a profile matching at least a portion of the profile of the edge of the tablet computer. The channel has a magnet array configured to magnetically attach to the magnet array of the edge of the tablet computer.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 13 is a perspective view of the combined cover and keyboard of FIG. 1 with a tablet computer attached thereto in the first orientation and in a keyboard configuration;

FIGS. 14a and 14b are perspective views of the combined cover and keyboard of FIG. 1 with the tablet computer attached thereto in the second opposite orientation and in a stand configuration;

FIG. 21 is a partial top plan view of the combined cover and keyboard of FIG. 1 with the tablet computer removed therefrom; and FIG. 22 is a back side view of the combined cover and keyboard of FIG. 1 with the tablet computer removed therefrom.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera.

The term "patterned magnet array" refers to an array of magnets with their polarity or poles oriented in a pattern. The array can be linear, and the pattern can include a series of magnets with alternating polarity or poles. In addition, the magnets can be paired or grouped, with individual magnets, or pairs or groups of magnets, spaced-apart from one another. Another second magnet array with a reverse pattern can be aligned with the first magnet array to magnetically attach the magnet arrays together, with reverse polarity or poles of the magnets in the arrays attracting one another. The pattern can be configured to be asymmetrical so that the magnet arrays have only a single desired magnetical attachment or a single desired orientation of one magnet array with respect to the other.

The terms "friction fit" and "interference fit" are used to describe a connection in which the matching or mating between components is configured to have greater than normal friction and/or interference.

DESCRIPTION

Figure 3:
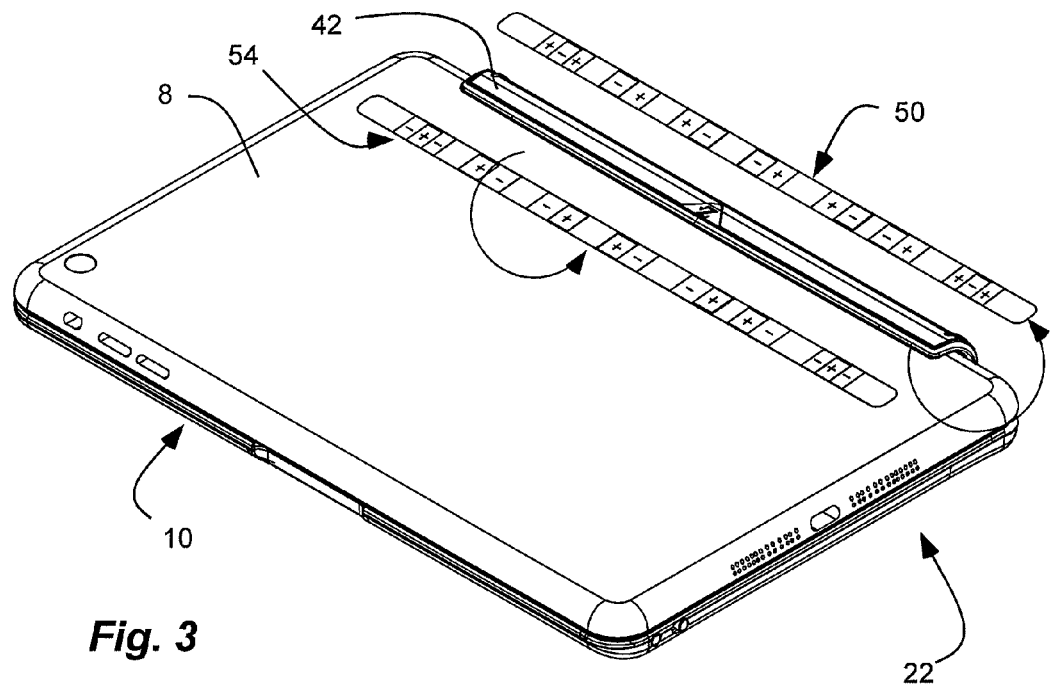
FIG. 3 is a perspective view of the combined cover and keyboard of FIG. 1 with a tablet computer attached thereto in a first orientation and in a cover configuration, and schematically showing a patterned magnet array of the tablet computer in relation to a patterned magnetic array of the channel of the reversible connection.
Figure 4:
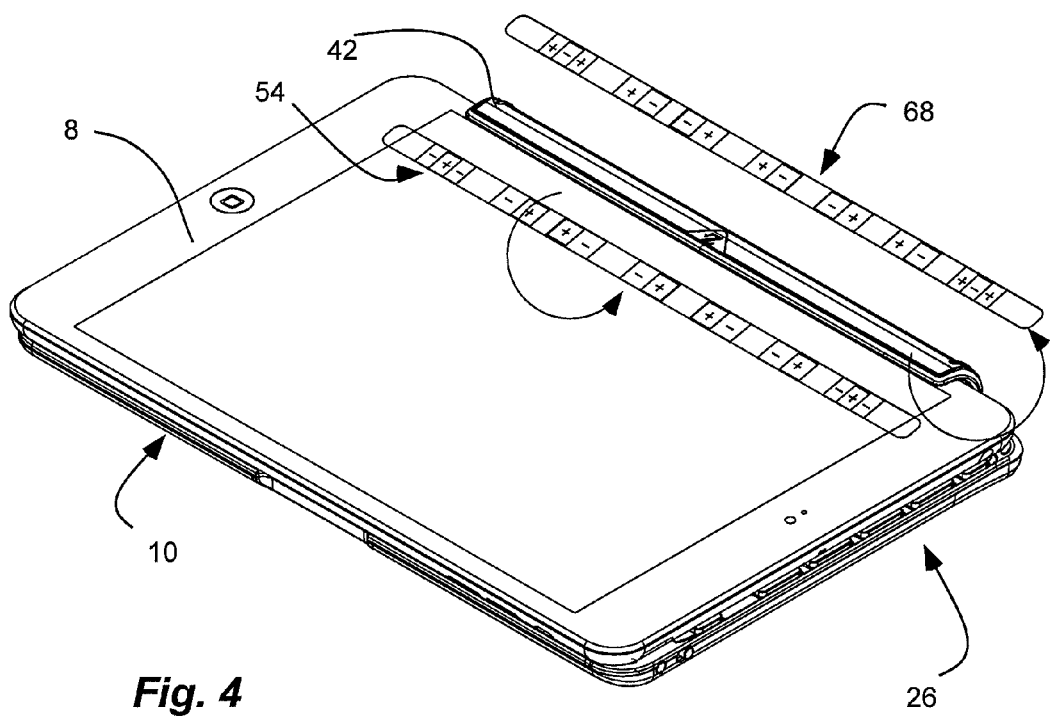
FIG. 4 is a perspective view of the combined cover and keyboard of FIG. 1 with the tablet computer attached thereto in a second opposite orientation and in a reading configuration, and schematically showing the patterned magnet array of the tablet computer in relation to a reversed patterned magnetic array of the tab or strip of the channel (with the magnet array of the tablet computer in the reading configuration being reversed with respect to the magnet array of the tablet computer in the cover configuration of FIG. 3; and with the reversed magnet array of the tab or strip being reversed with respect to the magnet array of the channel in FIG. 3)
Figure 11:
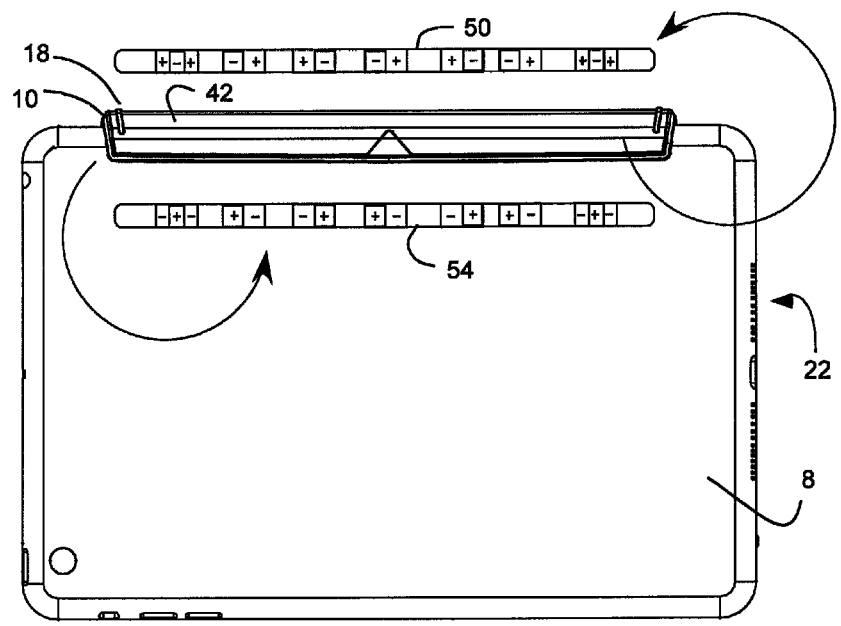
FIG. 11 is a top plan view of the combined cover and keyboard of FIG. 1 with the tablet computer attached thereto in a first orientation and in the cover configuration, and schematically showing a patterned magnet array of the tablet computer in relation to a patterned magnetic array of the channel of the reversible connection.
Figure 12:
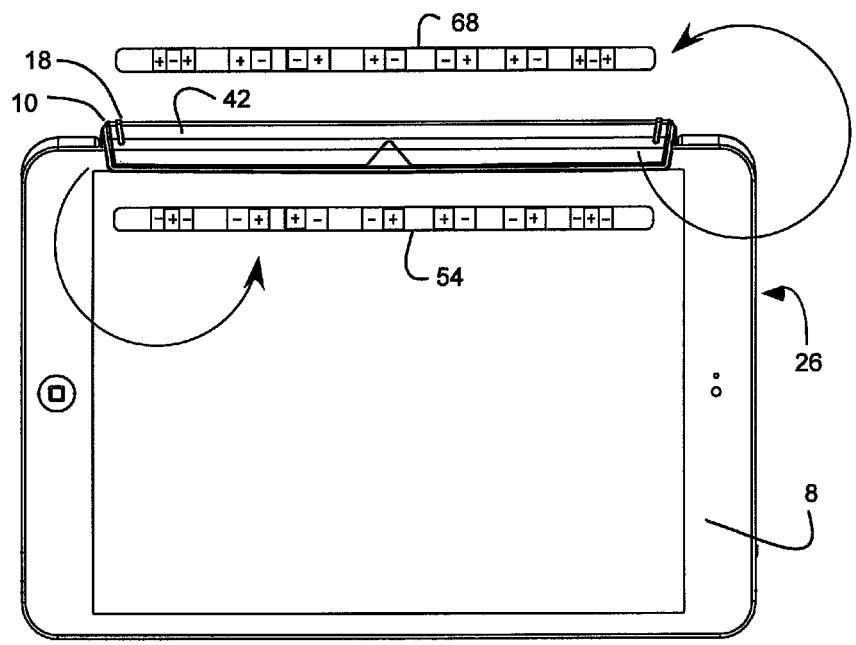
FIG. 12 is a top plan view of the combined cover and keyboard of FIG. 1 with the tablet computer attached thereto in a second opposite orientation and in the reading configuration, and schematically showing the patterned magnet array of the tablet computer in relation to a reversed patterned magnetic array of the tab or strip of the channel (with the magnet array of the tablet computer in the reading configuration being reversed with respect to the magnet array of the tablet computer in the cover configuration of FIG. 12; and with the reversed magnet array of the tab or strip being reversed with respect to the magnet array of the channel in FIG. 12)
Figure 15:
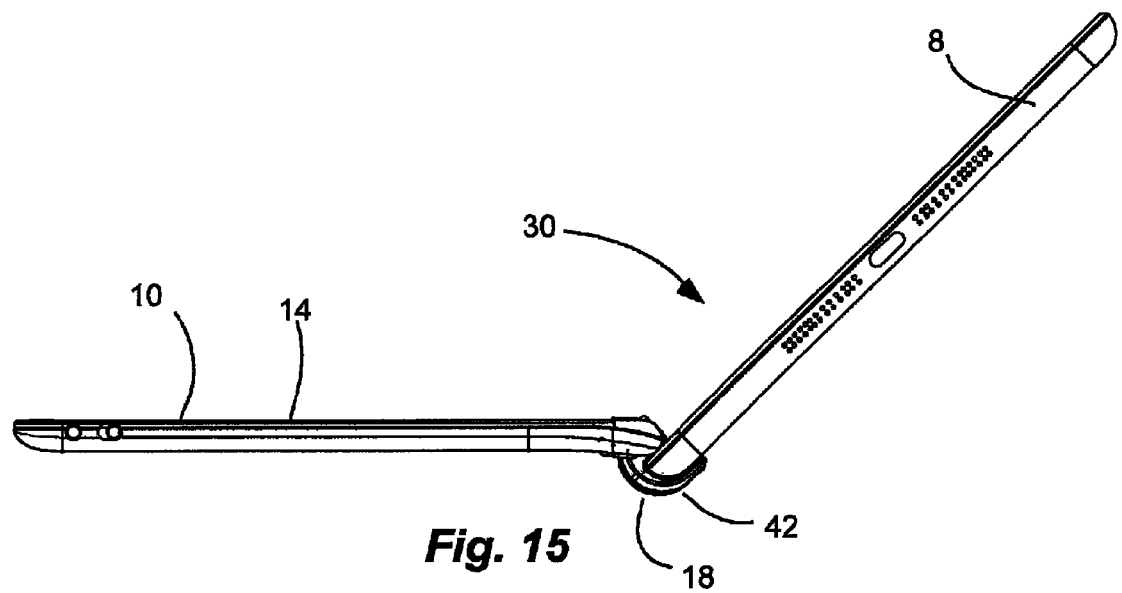
FIG. 15 is a side view of the combined cover and keyboard of FIG. 1 again showing the tablet computer attached thereto in the first orientation and in the keyboard configuration.
Figure 16:
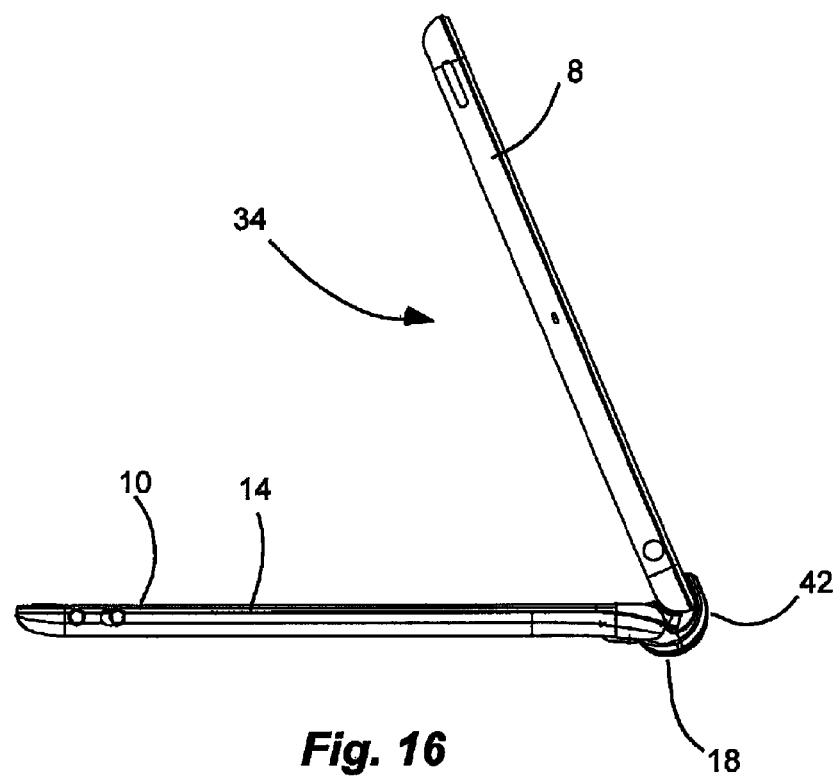
FIG. 16 is a side view of the combined cover and keyboard of FIG. 1 again showing the tablet computer attached thereto in the second opposite orientation and in the stand configuration.
Figure 17:
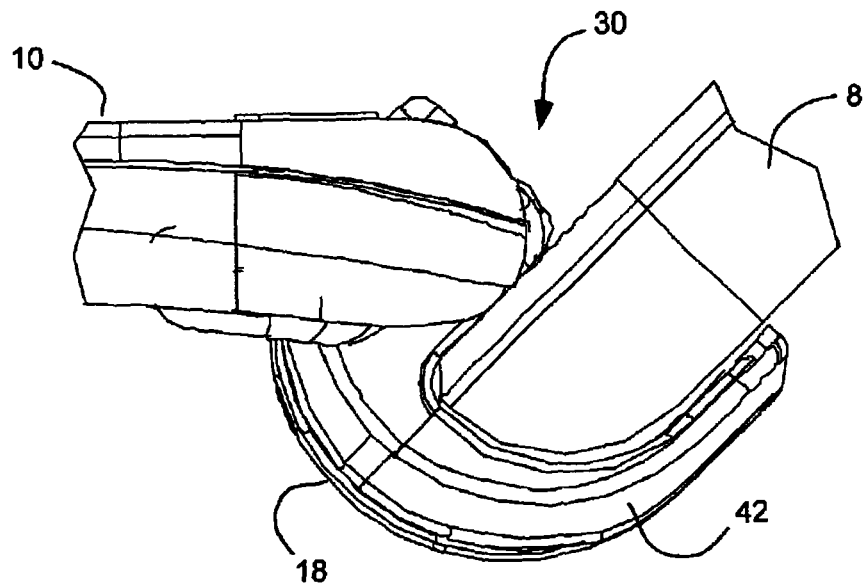
FIG. 17 is a partial side view of the combined cover and keyboard of FIG. 1 showing a detail of the tablet computer received in the channel of the reversible connection of the combined cover and keyboard in the first orientation and in the keyboard configuration, and with the interior of the channel substantially matching the asymmetrical profile of the edge of the tablet computer.
Figure 18:
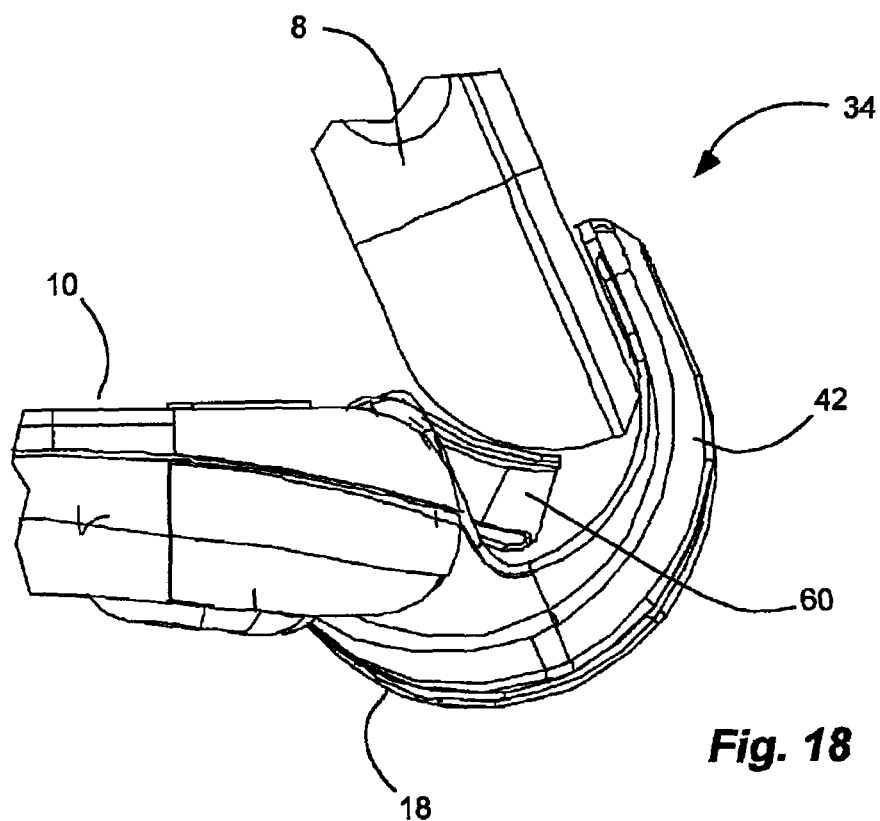
FIG. 18 is a partial side view of the combined cover and keyboard of FIG. 1 showing a detail of the tablet computer received in the channel of the reversible connection of the combined cover and keyboard in the second opposite orientation and in the stand configuration, and showing the tab or strip in the extended position.
Figure 19:
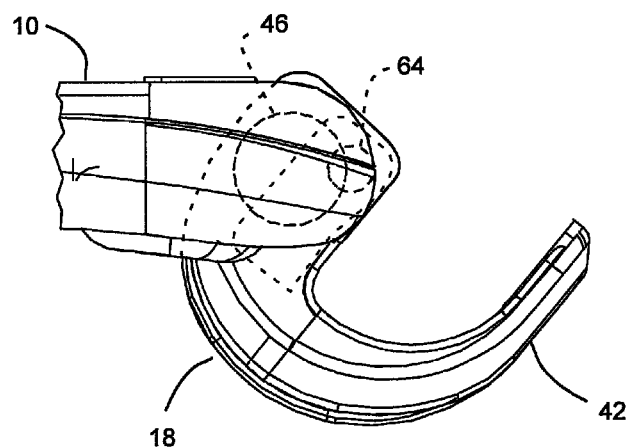
FIG. 19 is a partial side view of the combined cover and keyboard of FIG. 1 shown with the tablet computer removed from the interior of the channel.
Figure 20:
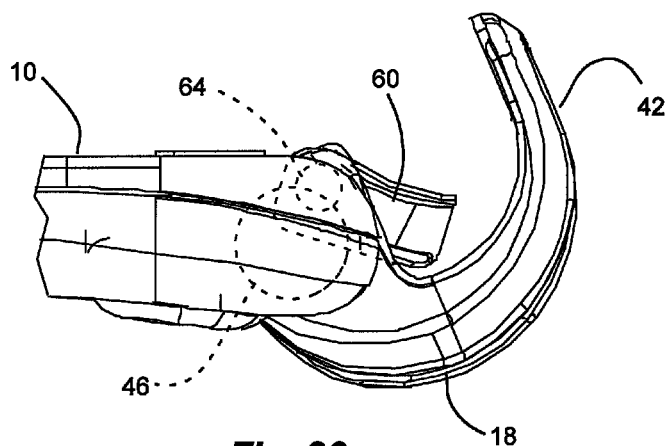
FIG. 20 is a partial side view of the combined cover and keyboard of FIG. 1 shown the tablet computer removed from the interior of the channel, and showing the tab or strip in the extended position.

As illustrated in FIGS. 1-22, a cover or combined cover and keyboard device, indicated generally at 10, in an example implementation in accordance with the invention is shown attached to a tablet computer or tablet 8. The cover 10 can be or can include a keyboard 14. In addition, the cover 10 can include a reversible connection device 18 to reversibly connect the cover 10 to the tablet 8 in two opposite configurations or orientations, such as a cover configuration 22 (FIGS. 3, 5 and 11) and a reading configuration 26 (FIGS. 4, 6 and 12), or a keyboard configuration 30 (FIGS. 13 and 15) and the reading configuration. The cover and keyboard configurations 22 and 30 can be first configurations or orientations, while the readying configuration 26 can be a second configuration or orientation. The cover 10 and/or connection 18 can also support a stand configuration 34 (FIGS. 14a, 4b and 16). The reading and stand configurations 26 and 34 can be second configurations or orientations. Thus, the reversible connection 18 can releasably connect or attach the cover 10 to the tablet 8 in the first configuration to protect the screen of the tablet 8 in the cover configuration 22, or allow typing or keyed entry on the keyboard 14 in the keyboard configuration 30; and in the second, opposite configuration to fold the cover 10 behind the tablet 8 in the reading configuration 26, or allow viewing the screen of the tablet in the stand configuration 34. Thus, the cover 10 can both protect the tablet or screen thereof, and fold out of the way or add thickness to the tablet 8 to facilitate grasping and holding in the reading configuration 26. In addition, the cover 10 can both provide the keyboard 14 in the keyboard configuration 30, and fold out of the way or add thickness to the tablet 8 to facilitate grasping and holding in the reading configuration 26. Furthermore, the cover 10 can support the tablet 8 for viewing in the stand configuration 34.

The reversible connection 18 of the cover 10 can reversibly connect to the tablet 8 so that the keyboard and screen can face one another (or oppose or abut to one another) in the cover configuration to protect both the screen and the keyboard with the cover closed opposing the a screen side of the tablet; expose both the keyboard and screen in the keyboard configuration for both visibility and keyboarding with the cover and the screed side of the tablet pivoted away from one another and exposed for use; expose the screen while protecting the keyboard in the reading configuration with the keyboard facing (or closed opposing) the back of the tablet; and protect the keyboard in the stand configuration. The reversible connection 18 can include a magnet array to attach to a magnet array in the tablet, as discussed in greater detail below. In addition, the connection 18 can accommodate an asymmetrical edge profile of the tablet in both opposite configurations. Furthermore, the reversible connection 18 can provide a second magnet array to magnetically connect to the magnet array of the tablet in the opposite configuration. Thus, the reversible connection 18 and/or cover 10 provides a pair of opposite magnet arrays that are separate and discrete from one another for connection to the tablet 8 in opposite orientations. The magnet arrays can be carried by the reversible connection.

The cover 10 can be a panel with a back or bottom side, and front or keyboard side with the keyboard 14. The cover or panel can have a size and shape that substantially matches that of the tablet. The keyboard 14 can have a plurality of keys that can be touched by a user. The keys can be touch sensitive and can physically displace or provide other haptic or tactile feedback to the user's fingers. The cover or panel can include a wireless transmitter to transmit the keystrokes to the tablet (and to be received by a wireless receiver of the tablet). The wireless transmitter can use a short-wave radio transmission with the Bluetooth™ standard. The cover or panel can include a rechargeable battery and a connection port to allow the battery to be recharged. The cover or panel can also include a light source or indicator, such as an LED, to indicate the power status of the keyboard, and/or to illuminate the keys.

The reversible connection 18 and/or cover 10 has a channel 42 to removably receive an edge of the tablet computer 8 therein in opposite first and second orientations. The channel 42 can be pivotally coupled to the cover 10 or panel. The channel 42 can be pivotally coupled to a rear or back edge of the cover. In addition, the channel can be elongated, but with a length less than a length of the edge of the cover. The rear or back edge of the cover can have a notch to receive a portion of the channel therein. The notch can be disposed between opposite tabs or flanges at the back of the cover. Thus, the cover or tabs or flanges can enclose or overlap the ends of the channel. The channel 42 can have opposite sides and a channel bottom that extend along a length thereof or along a longitudinal axis of the channel. The channel 42 or one of the sides thereof can be disposed in the notch between the tabs or flanges. The channel 42 can pivot about a pivot axis 46 extending between the tabs or flanges of the cover, and the lateral side of the channel. Thus, the channel pivots about one of the lateral sides thereof. The channel 42 can have an elongated interior or hollow to removably receive at least a portion of the edge of the tablet. The channel can have an interior profile (cross-sectional profile perpendicular or normal to a longitudinal axis or length of the channel) that substantially matches an edge profile of the tablet (again a cross-sectional profile perpendicular or normal to a length of the edge) in the first configuration or orientation. As described above, the edge profile of the tablet can be asymmetrical. For example, one side of the edge can have a larger radius, bevel or chamfer than an opposite side. Thus, the interior profile of the channel can also be asymmetrical. In the first orientation, the edge of the tablet can be entirely inserted into the channel to the channel bottom. The tablet computer can extend into the channel a first distance or all the way in the first configuration or orientation.

The channel 42, or the connection 18 or cover 10, also has a first magnet array 50 to magnetically attach to a patterned magnet array 54 of the edge of the tablet computer 8 in the first orientation of the tablet computer with respect to the cover. The first magnet array 50 can be recessed in an opposite side of the channel, opposite or opposing the side with the pivotal connection. Thus, the first magnet array 50 of the channel is laterally off-set from the pivot across the interior of the channel. The first magnet array 50 of the channel can be located to abut to or be adjacent to the magnet array 54 of the tablet 8 when the tablet is inserted into the channel. The magnet array 54 of the tablet 8 can include a patterned array of magnets with poles patterned along the array to create a unique or asymmetrical array or pattern to accept or magnetically attach to an opposite array or opposite pattern in a unique or single orientation, i.e. attaching in one direction, but not the other direction. Thus, the magnet array 54 of the tablet provides a directional or oriented attachment or connection that allows only a desired orientation of a connection (an not the reverse thereof). The first magnet array 50 of the channel 42 can be a patterned array of magnets with poles patterned along the array opposite that of the tablet so that the magnetic arrays of the channel and tablet form a magnetic connection. The magnetic array 50 of the channel is reverse or opposite that of the tablet, and oriented to attach to the tablet in the first orientation. Thus, the cover can be attached to the tablet and closed in the cover configuration, or opened to the keyboard configuration, without removing the cover and connection from the tablet.

Figure 1:
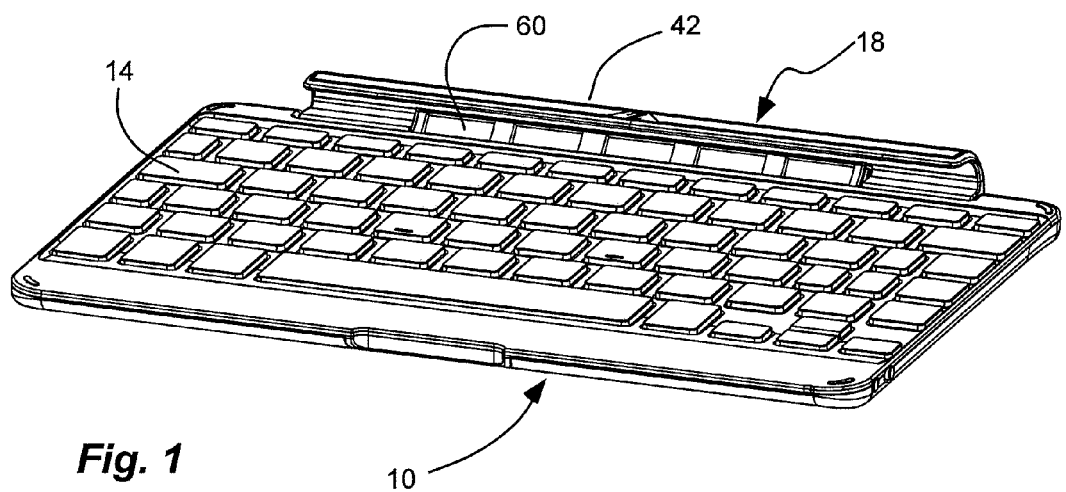
FIG. 1 is a perspective view of a combined cover and keyboard in accordance with an embodiment of the present invention with a tablet computer removed, and showing a reversible connection with a channel pivotally coupled to a cover and/or keyboard, and with a tab or strip pivotally coupled to the channel in an extended position into an interior of the channel.
Figure 2A:
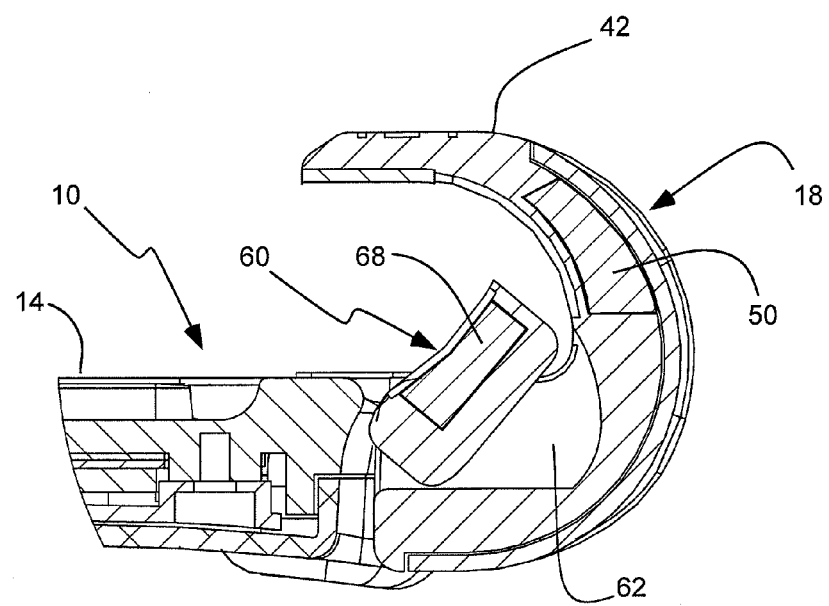
FIG. 2a is a partial cross-sectional side view of the combined cover and keyboard of FIG. 1 taken along line 2 of FIG. 21 showing the reversible connection with the channel pivotally coupled to the cover and/or keyboard, and with the tab or strip pivotally coupled to the channel in the extended position into the interior of the channel.
Figure 5:
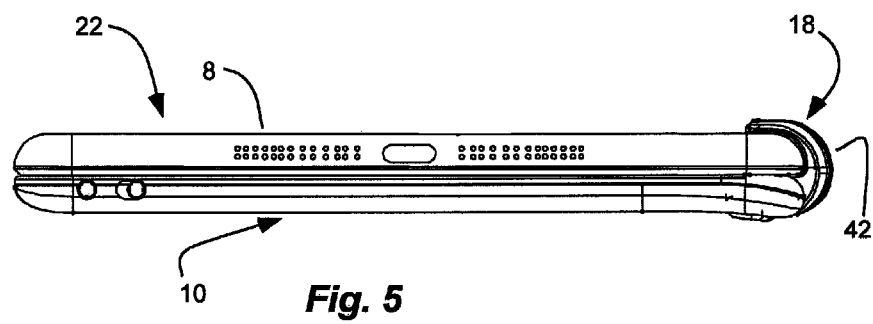
FIG. 5 is a side view of the combined cover and keyboard of FIG. 1 with the tablet computer attached thereto in the first orientation and in the cover configuration.
Figure 6:
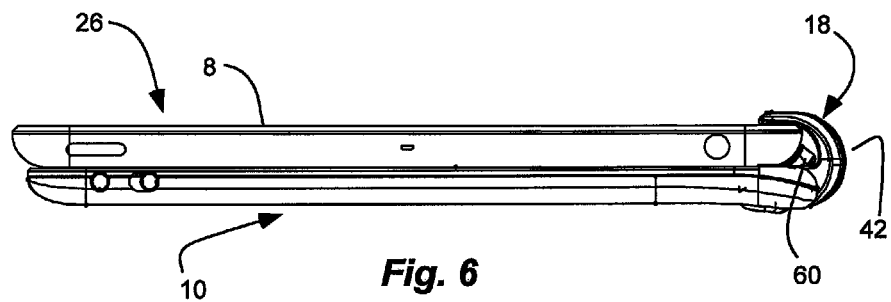
FIG. 6 is a side view of the combined cover and keyboard of FIG. 1 with the tablet computer attached thereto in the second opposite orientation and in the reading configuration.
Figure 2B:
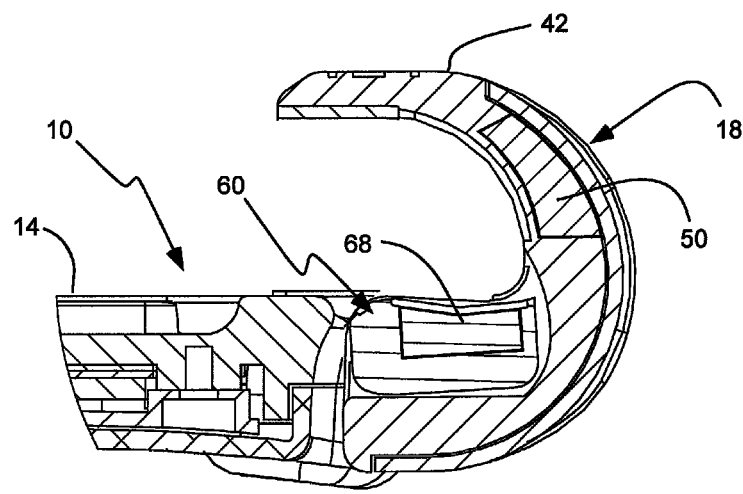
FIG. 2b is a partial cross-sectional side view of the combined cover and keyboard of FIG. 1 taken along line 2 of FIG. 21 showing the reversible connection with the channel pivotally coupled to the cover and/or keyboard, and with the tab or strip pivotally coupled to the channel in the retracted position out of the interior of the channel.
Figure 7:
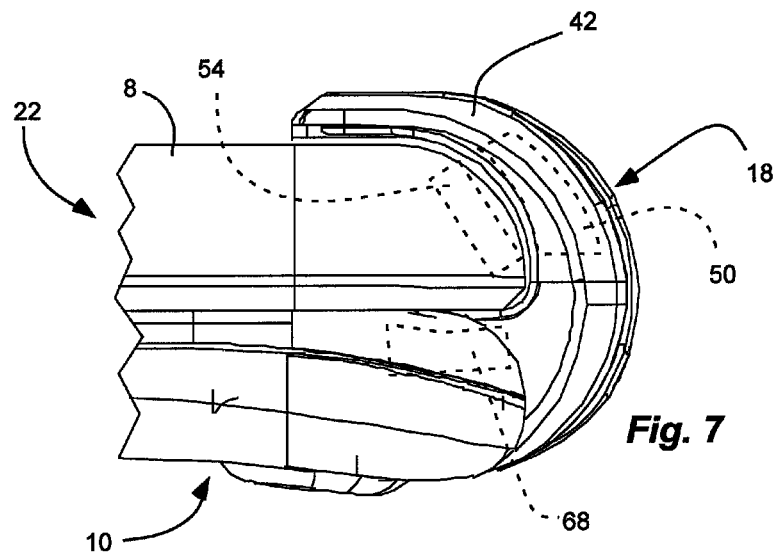
FIG. 7 is a partial side view of the combined cover and keyboard of FIG. 1 showing a detail of the tablet computer received in the channel of the reversible connection of the combined cover and keyboard in the first orientation and in the cover configuration, and with an interior of the channel substantially matching an asymmetrical profile of the edge of the tablet computer.
Figure 8:
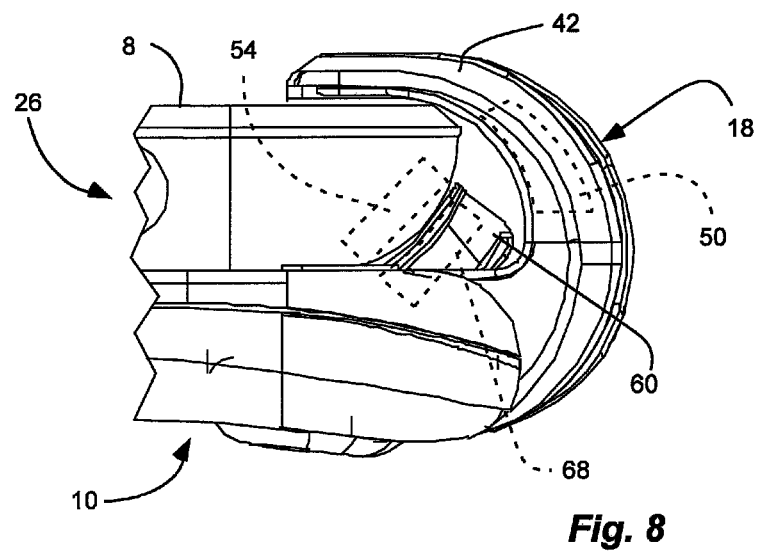
FIG. 8 is a partial side view of the combined cover and keyboard of FIG. 1 showing a detail of the tablet computer received in the channel of the reversible connection of the combined cover and keyboard in the second opposite orientation and in the reading configuration, and showing the tab or strip in the extended position and substantially matching at least a portion of the profile of the edge of the tablet computer.
Figure 9:
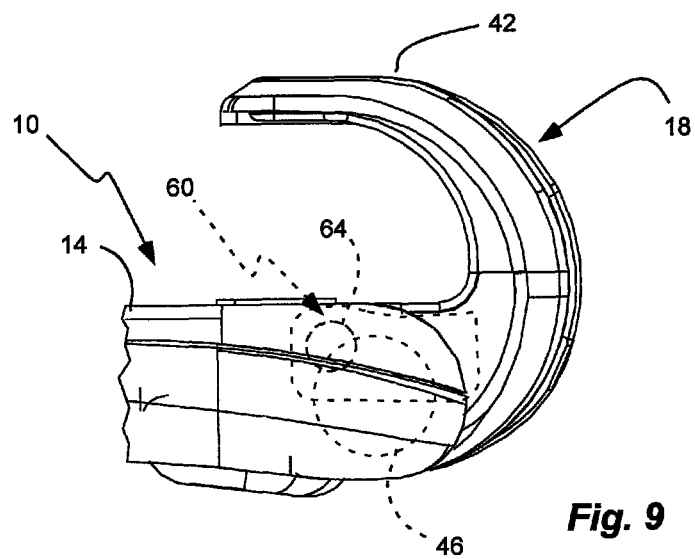
FIG. 9 is a partial side view of the combined cover and keyboard of FIG. 1 shown with the tablet computer removed from the interior of the channel.
Figure 10:
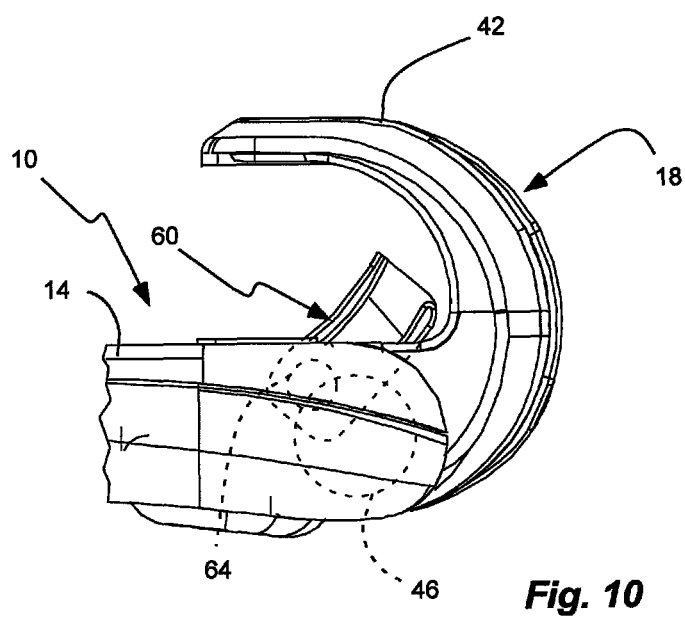
FIG. 10 is a partial side view of the combined cover and keyboard of FIG. 1 shown the tablet computer removed from the interior of the channel, and showing the tab or strip in the extended position.

The channel 42, or the connection 18 or cover 10, also has a tab or strip 60 that is movably coupled to and carried by the channel. The tab is movable or pivotal into and out of the interior of the channel. The tab 60 can move or pivot between a retracted position substantially out of the channel, and an extended position in the interior of the channel. The channel 42 or lateral side can have a cavity 62 therein in which the tab is received in the retracted position. The tab 60 can be pivotally coupled to the channel or lateral side thereof, and can be pivotal about a pivot axis 64. The tab 60 can move or pivot between a retracted position substantially out of the interior of the channel (in the cover and keyboard configurations, as shown in FIGS. 5 and 7) and an extended position in the interior of the channel (in the reading and stand configurations, as shown in FIGS. 6 and 8). The tab or strip 60 can be elongated, but shorter than the channel. The tab 60 has a second reversed magnet array 68 configured to magnetically attach to the magnet array 54 of the edge of the tablet computer 8 in a second reversed orientation of the tablet computer with respect to the cover 10. Thus, the second reversed magnet array 68 has a reversed orientation with respect to the first magnet array 50 of the channel, as shown in FIGS. 3, 4, 11 and 12. The second magnet array 68 is separate and discrete from the first magnet array 50. In addition, the tab 42 or a surface thereof has a profile that can match at least a portion of the profile of the edge of the tablet computer. Thus, the connection 18 can have two opposite orientations with respect to the tablet 8 in which the edge of the tablet is received in the channel 42 and magnetically attached to a magnet array (either the first magnet array 50 in a first orientation, or the second magnet array 68 in a second reversed orientation), and the patterned magnet array of the tablet is accommodated, and in which the asymmetrical profile of the edge of the tablet is accommodated.

In the first orientation, the edge of the tablet 8 is inserted into channel 42 (a first distance) with the interior (asymmetrical) profile of the channel 42 matching the asymmetrical profile of the edge of the tablet 8, and with the first magnet array 50 of the channel aligning and magnetically attaching to the patterned magnet array 54 of the tablet. The first orientation of the tablet 8 with respect to the connection 18 or cover 10 can correspond to the cover and keyboard configurations 22 and 30 (FIGS. 3, 5, 7, 11, 13, 15 and 17). In addition, in the first orientation, the tab or strip 60, along with the second magnet array 68, can move or pivot out of the interior of the channel 42, and into the cavity in the lateral side of the channel. The tab can be moved or pivoted by the edge of the tablet abutting thereto and forcing the tab, and/or by the patterned magnet array 54 of the tablet acting on the second magnet array 68 of the tab by magnet force (because it will be appreciated that in the first orientation the magnet arrays 54 and 68 of the tablet and the tab are mis-aligned).

In the second reversed orientation, the edge of the tablet 8 is inserted into the channel 42 (a second distance), but less than in the first orientation (or the edge of the tablet extends into the channel a second distance in the second orientation that is shorter than the first distance in the first orientation). The second orientation of the tablet 8 with respect to the connection 18 or cover 10 can correspond to the reading and stand configurations 26 and 34 (FIGS. 4, 6, 8, 12, 14a, 14b, 16 and 18). In addition, in the second orientation, the tab 42 can move or pivot into the interior of the channel 42 and out of or partially out of the cavity in the lateral side of the channel. The tab can be moved or pivoted by the magnetical attraction of the second magnet array 68 of the tab 60 to the patterned magnet array 54 of the tablet (because it will be appreciated that in the second orientation the magnet arrays 54 and 68 of the tablet and the tab are aligned).

In the second reversed orientation, the tab 60 with the second reversed magnet array 68 moves into the hollow of the channel 42, and between the magnet array 54 of the tablet computer 8 and the first magnet array 50 of the channel 42, as shown in FIG. 8. In addition, the outermost perimeter edge of the tablet abuts to the inner wall of the channel short of full insertion, and leaving a gap between the edge of the tablet and a bottom of the channel. The magnetic array 54 of the tablet computer 8 is spaced-apart from the first magnet array 50 of the channel 42 by the gap, and into which the tab 60 with the second reversed magnet array 68 moves in the second reversed orientation.

The tablet computer 8 can be removably retained in the channel 42 of the cover 10 by a magnetical force between the magnet array 50 of the channel and the magnet array 54 of the tablet computer, and a friction fit between an interior of the channel 42 and the tablet computer, in the first orientation. The tablet computer 8 can be removably retained in the channel 42 of the cover 10 by a magnetical force between the another reversed magnet array 68 of the tab 60, and a friction fit between an interior of the channel 42 and the tablet computer, in the another reversed orientation or second orientation. The interior of the channel can include a grip material such as a compressible, resilient and/or elastic material to compress as the edge of the tablet is inserted into the channel and exert an elastic force against the tablet. The grip material can have a high friction surface to resist movement of the tablet into or out of the channel, or along the channel. The magnetic arrays 50 and 64 of the channel 42 and tab 60 can maintain the edge of the computer in the channel, while the lateral sides of the channel resist tipping of the tablet in the channel.

The cover 10 and/or keyboard or panel can have multiple different configurations or orientations with respect to the tablet 8 due to the reverse connection 18 removably receiving the tablet in two opposite orientations and the pivotal connection of the channel to the cover or keyboard. The cover 10 and/or keyboard and panel can have at least two different configurations with respect to the tablet 8 computer, including: a cover configuration and a reading configuration. In the cover configuration (FIGS. 3, 5, 7 and 11), a keyboard side of the cover is closed against or opposing a screen side of the tablet computer, and the tablet computer is magnetically attached to the magnet array of the channel. Thus, the keyboard of the cover and the screen of the tablet can be protected. In the reading configuration (FIGS. 4, 6, 8 and 12), the keyboard side of the cover is closed against or opposing the back side of the tablet computer so that the screen side of the tablet computer and the back side of the cover are exposed, and the tablet computer is magnetically attached to the another reversed magnet array of the tab in the channel. Thus, the tablet can be held in either the portrait or landscape orientation, as desired, for readying, with the keyboard of the cover protected, and with the cover providing added thickness to help grip and hold the tablet along with the cover. In addition, with the cover reversed (with respect to the cover or keyboard configuration), a user's can grasp and hold the tablet and cover without engaging the keys of the keyboard, which are closed against the back of the tablet.

The cover 10 and/or keyboard and panel can have at least three different configurations with respect to the tablet computer 8, further including a keyboard configuration. In the keyboard configuration (FIGS. 13, 15 and 17), the keyboard side of the cover and the screen side of the tablet computer are pivoted away from one another and exposed for use, and the tablet computer is magnetically attached to the magnet array of the channel. Thus, the cover and/or keyboard can be pivoted about the pivot axel 46 with respect to the tablet to open the keyboard with respect to the tablet for typing or keyed entry. The cover 10 and/or keyboard and panel can have at least four different configurations with respect to the tablet computer 8, further including a stand configuration. In the stand configuration (FIGS. 14a, 14b, 16 and 18), the cover and the tablet computer are pivoted away from one another with the bottom of the cover disposed on a support surface and the screen side of the tablet computer oriented at an obtuse angle with respect to the support surface, and the tablet computer is magnetically attached to the another reversed magnet array of the tab in the channel. Thus, a back of the cover or keyboard is disposed on the support surface, without the keys of the keyboard being disposed against the support surface to avoid inadvertent contact.

The pivot 46 or hinge between the channel 42 and the cover 10 can be a friction or resistance pivot or hinge with increased friction or resistance to hold the tablet computer at an inclined angle in the keyboard and stand configurations, and to hold the tablet against the cover in the cover and reading configurations. Such friction and resistance hinges are known in the art. The pivot 64 or hinge between the tab 60 and the channel 42 can pivot freely.

As described above, the lateral side of the channel is pivotally coupled to the edge of the cover. A bottom of the channel pivots between a closed position in which the lateral side of the channel is substantially flush with a bottom of the cover, and an open position in which a bottom of the channel extends beyond the bottom of the cover. Thus, the bottom of the channel can dispose a bottom and/or top of the cover or keyboard at an acute incline with respect to a support surface. In addition, an opposite edge of the cover opposite the hinge can be or have a bevel to rest flush against the support surface.

In one aspect, the cover 10 as described above can be only a cover, without a keyboard. The bottom or back of the cover can be provided with non-slip feet that can protrude from the bottom or back and engage the support surface in the stand configuration, and that can engage the user's fingers in the cover configuration to help the user grasp and hold the tablet when not in use. In addition, the non-slip feet can engage the user's fingers in the reading configuration (with the tablet reversed with respect to the cover) to help the user grasp and hold the tablet while reading. Thus, the reverse connection of the cover can expose the non-slip feet of the cover in both of the reverse orientations of the cover and tablet.

In another aspect, the cover 10 can have a keyboard 14 as described above. Thus, the cover and keyboard can define a combined cover and keyboard that provide both cover and keyboard functions. In addition, the cover and keyboard can define a combined cover, keyboard, stand and grip.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A reversible connection device configured to attach a cover to a tablet computer in two opposite configurations, the device comprising:
    a) a channel pivotally coupled to the cover and configured to receive an edge of the tablet computer therein, and having a first magnet array configured to magnetically attach to a magnet array of the edge of the tablet computer in a first orientation of the tablet computer with respect to the cover and the channel; and
    b) a tab movably coupled in and carried by the channel and movable into the channel, and having a second reversed magnet array configured to magnetically attach to the magnet array of the edge of the tablet computer in a second reversed orientation of the tablet computer with respect to the cover and the channel, the second reversed magnet array having a reversed orientation with respect to the first magnet array of the channel.

2. The device in accordance with claim 1, wherein the cover further comprises:
    a keyboard.

3. The device in accordance with claim 1, wherein the tab is pivotally coupled to the channel and is pivotal between a retracted position out of an interior of the channel and an extended position in the interior of the channel.

4. The device in accordance with claim 1, further comprising:
    a cavity in a channel wall to receive the tab therein.

5. The device in accordance with claim 1, further comprising the tablet computer; and
    wherein the cover further comprises a keyboard.

6. The device in accordance with claim 5, further comprising the cover having at least three different configurations with respect to the tablet computer, including:
    a) a cover configuration in which a keyboard side of the cover is closed opposing a screen side of the tablet computer, and in which the tablet computer is magnetically attached to the first magnet array of the channel;
    b) a keyboard configuration in which the keyboard side of the cover and the screen side of the tablet computer are pivoted away from one another and exposed for use, and in which the tablet computer is magnetically attached to the first magnet array of the channel; and
    c) a reading configuration in which the keyboard side of the cover is closed opposing the back side of the tablet computer so that the screen side of the tablet computer and the back side of the cover are exposed, and in which the tablet computer is magnetically attached to the second reversed magnet array of the tab in the channel.

7. The device in accordance with claim 6, further comprising the cover having at least four different configurations with respect to the tablet computer, further including:
    a stand configuration in which the cover and the tablet computer are pivoted away from one another with a bottom of the cover disposed on a support surface and the screen side of the tablet computer oriented at an obtuse angle with respect to the support surface, and in which the tablet computer is magnetically attached to the second reversed magnet array of the tab in the channel.

8. The device in accordance with claim 5, wherein an interior of the channel has an interior profile configured to substantially match a profile of an edge of the tablet computer; and wherein the tab has a profile matching at least a portion of the profile of the edge of the tablet computer.

9. The device in accordance with claim 5, wherein the tablet computer is removably retained in the channel of the cover by a magnetical force between the magnet array of the channel and a magnet array of the tablet computer and a friction fit between an interior of the channel and the tablet computer in the first orientation; and wherein the tablet computer is removably retained in the channel of the cover by a magnetical force between the second reversed magnet array of the tab and a friction fit between an interior of the channel and the tablet computer in the second reversed orientation.

10. The device in accordance with claim 5, wherein the tablet computer extends into the channel a first distance in the first orientation, and into the channel a second distance shorter than the first distance in the second reversed orientation.

11. The device in accordance with claim 5, wherein the tab with the second reversed magnet array moves into an interior of the channel, and between the magnet array of the tablet computer and the first magnet array of the channel, in the second reversed orientation of the tablet computer with respect to the cover and the channel.

12. The device in accordance with claim 5, wherein the magnetic array of the tablet computer is spaced-apart from the first magnet array of the channel in the second reversed orientation of the tablet computer with respect to the cover and the channel by a gap into which the tab with the second reversed magnet array moves in the second reversed orientation.

13. A combined cover and keyboard device configured for a tablet computer having an edge with a non-symmetrical profile and a patterned magnet array, the device comprising:
  a) a keyboard;
  b) a channel pivotally coupled to an edge of the keyboard and configured to removably receive the edge of the tablet computer and having an interior with a profile substantially matching the profile of the edge of the tablet computer in a first orientation of the tablet computer with respect to the keyboard;
  c) a first patterned magnet array disposed in and carried by the channel configured to magnetically couple to the patterned magnet array of the tablet computer in the first orientation;
  d) a strip pivotally coupled in and carried by the channel and having a profile matching at least a portion of the profile of the edge of the tablet computer in a second reversed orientation of the tablet computer with respect to the keyboard;
  e) a second patterned magnet array carried by the strip and configured to magnetically attach to the magnet array of the edge of the tablet computer in the second reversed orientation of the tablet computer with respect to the keyboard;
  f) the second patterned magnet array of the strip being reversed with respect to the first patterned magnet array of the channel;
  g) the keyboard and the tablet computer being reversible with respect to one another and having at least three different configurations with respect to one another, including:
    i) a cover configuration in which a keyboard side of the keyboard is closed opposing a screen side of the tablet computer, and in which the tablet computer is magnetically attached to the first magnet array of the channel;
    ii) a keyboard configuration in which the keyboard side of the keyboard and the screen side of the tablet computer are pivoted away from one another and exposed for use, and in which the tablet computer is magnetically attached to the first magnet array of the channel; and
    iii) a reading configuration in which the keyboard side of the keyboard is closed opposing the back side of the tablet computer so that the screen side of the tablet computer and the back side of the keyboard are exposed, and in which the tablet computer is magnetically attached to the second reversed magnet array of the tab in the channel.

14. The device in accordance with claim 13, further comprising:
  a cavity in a channel wall to receive the strip therein.

15. The device in accordance with claim 13, wherein the strip with the second reversed magnet array moves into an interior of the channel, and between the magnet array of the tablet computer and the first magnet array of the channel, in the second reversed orientation of the tablet computer with respect to the cover and the channel.

16. The device in accordance with claim 13, wherein the magnetic array of the tablet computer is spaced-apart from the first magnet array of the channel in the second reversed orientation of the tablet computer with respect to the cover and the channel by a gap into which the strip with the second reversed magnet array moves in the second reversed orientation.

17. The device in accordance with claim 13, further comprising the keyboard having at least four different configurations with respect to the tablet computer, further including:
  a stand configuration in which the keyboard and the tablet computer are pivoted away from one another with a bottom of the keyboard disposed on a support surface and the screen side of the tablet computer oriented at an obtuse angle with respect to the support surface, and in which the tablet computer is magnetically attached to the second reversed magnet array of the tab in the channel.

18. The device in accordance with claim 13, wherein the tablet computer extends into the channel a first distance in the first orientation, and into the channel a second distance shorter than the first distance in the second reversed orientation.

* * * * *